(12) United States Patent
Koshima et al.

(10) Patent No.: US 11,390,825 B2
(45) Date of Patent: Jul. 19, 2022

(54) DISPERSING AGENT FOR LUBRICATING OIL, METHOD FOR PRODUCING SAME, AND LUBRICATING OIL COMPOSITION

(71) Applicant: IDEMITSU KOSAN CO., LTD., Chiyoda-ku (JP)

(72) Inventors: Hiroaki Koshima, Chiba (JP); Yoriyuki Takashima, Ichihara (JP); Moritsugu Kasai, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 17/040,711

(22) PCT Filed: Mar. 29, 2019

(86) PCT No.: PCT/JP2019/014343
§ 371 (c)(1),
(2) Date: Sep. 23, 2020

(87) PCT Pub. No.: WO2019/189887
PCT Pub. Date: Oct. 3, 2019

(65) Prior Publication Data
US 2021/0009918 A1   Jan. 14, 2021

(30) Foreign Application Priority Data

Mar. 30, 2018   (JP) .............................. JP2018-070380

(51) Int. Cl.
*C10M 133/56*   (2006.01)
*C08F 8/46*   (2006.01)
(Continued)

(52) U.S. Cl.
CPC ............. *C10M 133/56* (2013.01); *C08F 8/46* (2013.01); *C08F 110/08* (2013.01);
(Continued)

(58) Field of Classification Search
CPC ............. C10M 129/76; C10M 133/56; C10M 143/18; C10M 161/00; C10M 169/044;
(Continued)

(56) References Cited

U.S. PATENT DOCUMENTS 4,605,808 A   8/1986   Samson
5,674,819 A   10/1997  Sivik et al.
(Continued)

FOREIGN PATENT DOCUMENTS

JP   61-500266 A   2/1986
JP   61-258897 A   11/1986
(Continued)

OTHER PUBLICATIONS

International Search Report dated Jul. 2, 2019 in PCT/JP2019/014343 filed on Mar. 29, 2019, citing documents AA-AB and AO-AS therein, 2 pages.

(Continued)

*Primary Examiner* — James C Goloboy
(74) *Attorney, Agent, or Firm* — Oblon, McClelland, Maier & Neustadt, L.L.P.

(57) ABSTRACT

A dispersant for a lubricating oil, containing at least one compound selected from a specific nitrogen-containing compound which is obtained by using, as raw materials, (A) at least one polyolefin selected from polybutene and polyisobutene, (B) at least one maleic acid compound selected from maleic acid and maleic anhydride, and (C) polyamine; a boride of the specific nitrogen-containing compound; and an acylated product of the specific nitrogen-containing compound. The polyolefin (A) satisfies at least one of the following conditions (α) and (β). (α) a ratio (Sb/Sa) of an integrated value (Sb) of a peak present at 4.40 to 5.00 ppm in a $^1$H-NMR spectrum to an integrated value (Sa) of a peak present at 5.01 to 5.60 ppm in the 1H-NMR spectrum is 2 or (Continued)

more. (β) a ratio (Sd/Sc) of an integrated value (Sd) of a peak present at 1.76 to 2.10 ppm in the $^1$H-NMR spectrum to an integrated value (Sc) of a peak present at 1.65 to 1.75 ppm in the $^1$H-NMR spectrum is 1 or more.

9 Claims, 1 Drawing Sheet

(51) Int. Cl.
    *C08F 110/08*     (2006.01)
    *C10M 169/04*     (2006.01)
    *C10N 30/04*     (2006.01)
    *C10N 40/25*     (2006.01)
    *C10N 30/02*     (2006.01)
    *C10N 20/02*     (2006.01)
    *C10N 20/04*     (2006.01)

(52) U.S. Cl.
    CPC .. *C10M 169/044* (2013.01); *C10M 2203/003* (2013.01); *C10M 2203/1006* (2013.01); *C10M 2205/12* (2013.01); *C10M 2207/284* (2013.01); *C10M 2215/28* (2013.01); *C10N 2020/02* (2013.01); *C10N 2020/04* (2013.01); *C10N 2030/02* (2013.01); *C10N 2030/04* (2013.01); *C10N 2040/25* (2013.01)

(58) Field of Classification Search
    CPC .... C10M 2203/003; C10M 2203/1006; C10M 2205/12; C10M 2207/284; C10M 2215/28; C08F 8/32; C08F 8/46; C08F 110/08; C10N 2020/02; C10N 2020/04; C10N 2030/02; C10N 2030/04; C10N 2040/25

See application file for complete search history.

(56) References Cited

U.S. PATENT DOCUMENTS

| | | | | |
|---|---|---|---|---|
| 5,686,398 | A | * | 11/1997 | Minokami .............. C10L 10/08 508/481 |
| 2008/0020950 | A1 | * | 1/2008 | Gray .................... C10M 167/00 508/149 |
| 2011/0039743 | A1 | * | 2/2011 | Bagheri ............... C10M 107/10 508/591 |
| 2018/0016515 | A1 | * | 1/2018 | Lagona ................ C10M 169/04 |

FOREIGN PATENT DOCUMENTS

| | | | | |
|---|---|---|---|---|
| JP | 2-101070 | A | | 4/1990 |
| JP | 02101070 | A | * | 4/1990 ............ C10L 1/1883 |
| JP | 9-169819 | A | | 6/1997 |
| JP | 2010-43272 | A | | 2/2010 |
| JP | 2012-513495 | A | | 6/2012 |
| JP | 2014-80526 | A | | 5/2014 |

OTHER PUBLICATIONS

Japanese Office Action dated Mar. 1, 2022 in Japanese Patent Application No. 2018-070380 (with unedited computer generated English translation), 7 pages.

* cited by examiner

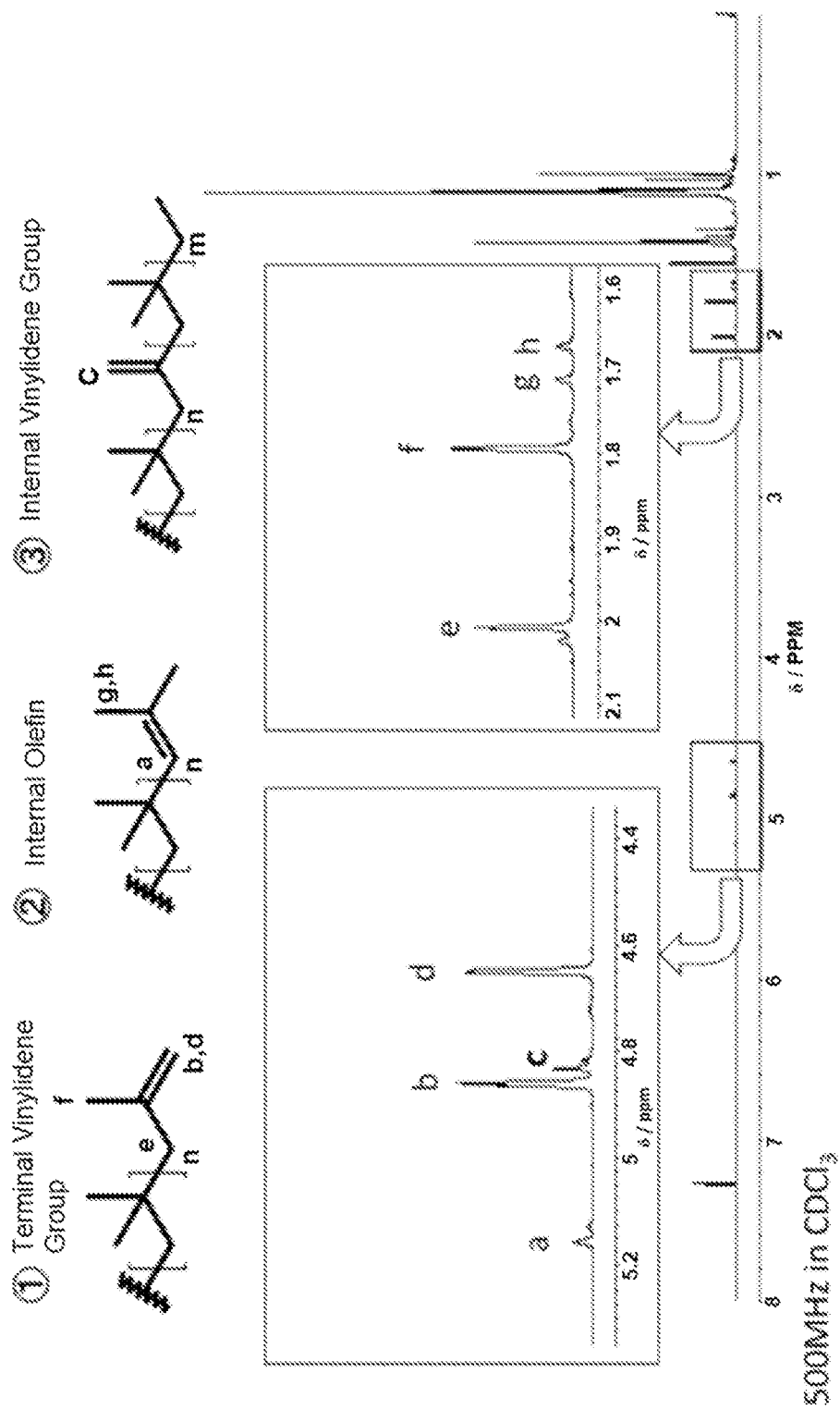

DISPERSING AGENT FOR LUBRICATING OIL, METHOD FOR PRODUCING SAME, AND LUBRICATING OIL COMPOSITION

TECHNICAL FIELD

The present invention relates to a dispersant for a lubricating oil and a production method thereof, and a lubricating oil composition containing the dispersant for a lubricating oil.

BACKGROUND ART

Environmental problems are being highlighted on a global scale, and "exhaust gas purification" and "fuel saving property" are strongly required for vehicles such as automobiles. Along with these demands, new improvements of "exhaust gas purification" and "fuel saving property" are also required for a lubricating oil composition used for vehicles such as automobiles.

Regarding "exhaust gas purification," measures against environmental pollution caused by nitrogen oxide ($NO_x$), particulate emissions (PM), etc. in an exhaust gas of a combustion engine, especially, a diesel engine, are important issues.

As concrete measures for reducing $NO_x$, lowering a peak combustion temperature may be exemplified. The peak combustion temperature may be achieved by increasing an exhaust gas recirculation (EGR) rate or delaying a fuel injection timing. However, when the peak combustion temperature is reduced for the purpose of $NO_x$ reduction, the emission amount of black smoke or PM increases. Thus, a use in combination with a post-treatment device for the exhaust gas is necessary. As for the post-treatment device for the exhaust gas, a PM trap or the like has been examined. The PM trap generally has a filter structure.

By the way, a lubricating oil composition for a combustion engine, especially, a lubricating oil composition for a diesel engine, has conventionally been used in combination with a detergent and a dispersant.

The "detergent" means an additive having a function of preventing and suppressing the deposition of a deteriorated substance mainly in a high temperature operation.

The "dispersant" is an additive that disperses sludge, etc. generated at a relatively low temperature, in oil.

As for the detergent, a metal-based detergent that contains at least one metal of alkali metals and alkaline earth metals is generally used. Specifically, sulfonates, phenates, salicylates, and phosphonates of the metal, and overbased compounds thereof, etc. are used as metal-based detergents.

Thus, there is a concern that a metal component in the metal-based detergent contained in the lubricating oil composition may be mixed with an exhaust gas, and clog a filter of the post-treatment device for the exhaust gas.

As measures against a filter clogging problem of the post-treatment device of the exhaust gas, reducing an amount of a metal-based detergent to be used, or using an ashless detergent instead of the metal-based detergent may be exemplified. However, it is difficult to maintain properties such as high-temperature cleanliness required for the lubricating oil composition only by these measures. Therefore, in order to maintain the properties such as high-temperature cleanliness required for the lubricating oil composition, various dispersants to be used in combination with the detergent have been suggested, and various ashless dispersants have also been suggested.

As for these ashless dispersants, various nitrogen-containing compounds such as alkenyl succinimide, alkyl succinimide, alkenyl succinamide, and alkyl succinamide have been suggested.

For example, Patent Literature 1 describes that succinimide, succinamide or the like is useful as a dispersant, in which succinimide and succinamide, or a mixture thereof may be post-treated with phthalic anhydride or ethylene carbonate.

Also, Patent Literature 2 describes a production method of a succinimide composition used as a dispersant.

CITATION LIST

Patent Literature

PTL 1: JP 2012-513495 A
PTL 2: JP 2010-043272 A

SUMMARY OF INVENTION

Technical Problem

Meanwhile, as described above, new improvements in "fuel saving property" as well as "exhaust gas purification" are also required for the lubricating oil composition used for vehicles such as automobiles. As one of methods of improving the "fuel saving property" of the lubricating oil composition, a viscosity reduction of the lubricating oil composition may be exemplified.

However, the nitrogen-containing compound used as the ashless dispersant increases the viscosity of the lubricating oil composition, and thus may be an obstacle in improving the "fuel saving property."

As specific explanation, the nitrogen-containing compound is generally handled in a state where the nitrogen-containing compound itself, and an unreacted product of polyolefin that is a raw material for synthesizing the nitrogen-containing compound (hereinafter, also referred to as "unreacted polyolefin") are mixed. This is because the polyolefin cannot be distilled due to its high molecular weight and high boiling point, and since its solubility in various solvents is about the same as that of the nitrogen-containing compound, it is difficult to remove the unreacted polyolefin.

Thus, when the nitrogen-containing compound is added to the lubricating oil composition, if an attempt is made to secure a sufficient addition amount of the nitrogen-containing compound itself as an active ingredient that functions as the dispersant, a large amount of unreacted polyolefin is also inevitably added.

However, while the nitrogen-containing compound has a high viscosity, the unreacted polyolefin also has a high viscosity. Thus, the unreacted polyolefin that is added as an extra and does not contribute as a dispersant at all becomes a factor of further increasing the viscosity of the lubricating oil composition.

For this reason, a method of using a low-viscosity lubricant base oil has conventionally been employed in order to reduce the viscosity of the lubricating oil composition. However, when the low-viscosity lubricant base oil is used, a new problem such as an increase of a NOACK value or a decrease of a flash point is likely to occur.

Therefore, it is thought that when the nitrogen-containing compound with a high purity is provided with a low content of unreacted polyolefin, a viscosity increase of the lubricating oil composition, that is caused by the unreacted polyolefin, may be suppressed, and then, if it is possible to increase the degree of freedom of selection of the lubricant base oil, it is easy to further improve the fuel saving property of the lubricating oil composition. Besides, it is thought that when the nitrogen-containing compound with a high purity is provided with a low content of unreacted polyolefin, the addition amount of the nitrogen-containing compound as an active ingredient may be sufficiently secured or improved through addition of a smaller amount, and thus it is possible to maintain or improve the high-temperature cleanliness, the base number, and the sludge dispersibility of the lubricating oil composition.

An object of the present invention is to provide a dispersant for a lubricating oil and a production method thereof, and a lubricating oil composition containing the dispersant for a lubricating oil, in which the high-temperature cleanliness, the base number, and the sludge dispersibility of the lubricating oil composition are maintained or improved, and the lubricating oil composition with a low viscosity is easily prepared.

Solution to Problem

As a result of intensive repetitive studies, the present inventors, etc., found that when a specific polyolefin is used as a raw material in synthesizing a nitrogen-containing compound (alkenyl succinimide, alkyl succinimide, alkenyl succinamide, and alkyl succinamide), a boride of the nitrogen-containing compound or an acylated product of the nitrogen-containing compound, the above-mentioned problems may be solved, and then have completed the present invention.

That is, the present invention relates to the followings [1] to [3].

[1] A dispersant for a lubricating oil, containing at least one compound selected from a nitrogen-containing compound represented by any one of the following formulae (1) to (4), which is obtained by using as, raw materials, (A) at least one polyolefin selected from polybutene and polyisobutene, (B) at least one maleic acid compound selected from maleic acid and maleic anhydride, and (C) polyamine; a boride of the nitrogen-containing compound; and an acylated product of the nitrogen-containing compound:

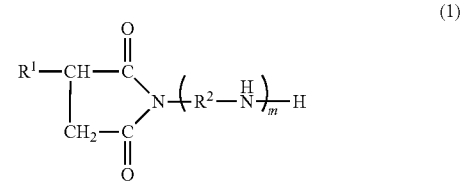

(1)

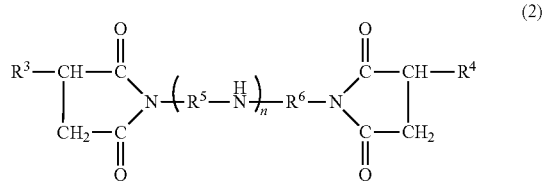

(2)

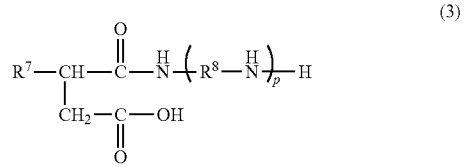

(3)

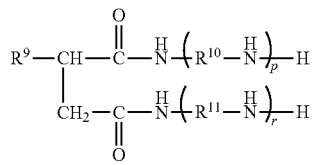

(4)

wherein each of $R^1$, $R^3$, $R^4$, $R^7$, and $R^9$ is independently an alkenyl group selected from a polybutenyl group and a polyisobutenyl group, or an alkyl group selected from a hydrogenated polybutenyl group and a hydrogenated polyisobutenyl group, a molecular weight distribution (Mw/Mn) of the alkenyl group and the alkyl group is 1.80 or less, and a mass average molecular weight (Mw) is 500 to 5,000;

each of $R^2$, $R^5$, $R^6$, $R^8$, $R^{10}$, and $R^1$ is independently an alkylene group having 2 to 5 carbon atoms; and each of m, n, p, q, and r is independently an integer of 1 to 10, and wherein the polyolefin (A) satisfies at least one of the following conditions (α) and (δ):

(α) a ratio (Sb/Sa) of an integrated value (Sb) of a peak present at 4.40 to 5.00 ppm in a $^1$H-NMR spectrum to an integrated value (Sa) of a peak present at 5.01 to 5.60 ppm in the $^1$H-NMR spectrum is 2 or more; and (β) a ratio (Sd/Sc) of an integrated value (Sd) of a peak present at 1.76 to 2.10 ppm in the $^1$H-NMR spectrum to an integrated value (Sc) of a peak present at 1.65 to 1.75 ppm in the $^1$H-NMR spectrum is 1 or more.

[2] A lubricating oil composition containing the dispersant for a lubricating oil described in [1] as above, and a lubricant base oil.

[3] A method for producing the dispersant for a lubricating oil described in [1] as above, the method including the following reaction steps (S1) and (S2):

reaction step (S1): a step in which (A) at least one polyolefin selected from polybutene and polyisobutene is reacted with (B) at least one maleic acid compound selected from maleic acid and maleic anhydride, and reaction step (S2): a step in which a reaction product (X) obtained in the reaction step (S) is reacted with (C) polyamine to obtain a nitrogen-containing compound, wherein the polyolefin (A) satisfies at least one of the following conditions (α) and (β):

(α) a ratio (Sb/Sa) of an integrated value (Sb) of a peak present at 4.40 to 5.00 ppm in a $^1$H-NMR spectrum to an integrated value (Sa) of a peak present at 5.01 to 5.60 ppm in the $^1$H-NMR spectrum is 2 or more, and (β) a ratio (Sd/Sc) of an integrated value (Sd) of a peak present at 1.76 to 2.10 ppm in the $^1$H-NMR spectrum to an integrated value (Sc) of a peak present at 1.65 to 1.75 ppm in the $^1$H-NMR spectrum is 1 or more.

Advantageous Effects of Invention

According to the present invention, it is possible to provide a dispersant for a lubricating oil and a production method thereof, and a lubricating oil composition containing the dispersant for a lubricating oil, in which the high-temperature cleanliness, the base number, and the sludge dispersibility of the lubricating oil composition are maintained or improved, and the lubricating oil composition with a low viscosity is easily prepared.

BRIEF DESCRIPTION OF DRAWINGS

FIG. 1 is a view illustrating an example of a $^1$H-NMR spectrum of polybutene.

DESCRIPTION OF EMBODIMENTS

In the present specification, the lower limit values and the upper limit values described stepwise regarding preferred numerical ranges (for example, a range of a content, etc.) may be combined independently from each other. For example, from the description "preferably 10 to 90, more preferably 30 to 60," the "preferable lower limit value (10)" and the "more preferable upper limit value (60)" may be combined as "10 to 60."

[Dispersant for Lubricating Oil]

A dispersant for a lubricating oil of the present invention contains: at least one compound selected from a nitrogen-containing compound represented by the following formulae (1) to (4), which is obtained by using, as raw materials, (A) at least one polyolefin selected from polybutene and polyisobutene, (B) at least one maleic acid compound selected from maleic acid and maleic anhydride, and (C) polyamine; a boride of the nitrogen-containing compound; and an acylated product of the nitrogen-containing compound.

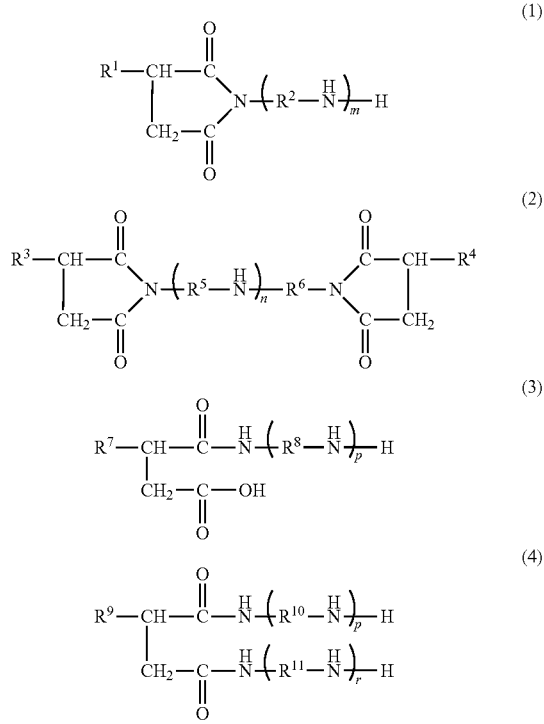

In formulae (1) to (4), each of $R^1$, $R^3$, $R^4$, $R^7$, and $R^9$ is independently an alkenyl group selected from a polybutenyl group and a polyisobutenyl group, or an alkyl group selected from a hydrogenated polybutenyl group and a hydrogenated polyisobutenyl group.

In formula (2), $R^3$ and $R^4$ may be the same or different.

In the present invention, the molecular weight distribution (Mw/Mn) of the alkenyl group and the alkyl group is 1.80 or less. When the molecular weight distribution (Mw/Mn) is larger than 1.80, an alkenyl group or an alkyl group by which the viscosity of the nitrogen-containing compound is likely to be further increased is mixed, and the dispersant for a lubricating oil, by which the viscosity of a lubricating oil composition is likely to be further increased, is obtained. Thus, a problem may occur in which the viscosity of a lubricant base oil that may be used is limited.

In an aspect of the present invention, from the viewpoint of suppressing a viscosity increase of the lubricating oil composition, and then facilitating preparation of the lubricating oil composition with a lower viscosity, the molecular weight distribution (Mw/Mn) of the alkenyl group and the alkyl group is preferably 1.75 or less, more preferably 1.70 or less, further preferably 1.65 or less.

Also, in the present invention, the mass average molecular weight (Mw) of the alkenyl group and the alkyl group is 500 to 5,000.

When the mass average molecular weight (Mw) of the alkenyl group and the alkyl group is less than 500, the solubility in the lubricant base oil is decreased. Also, it is not possible to sufficiently secure the high-temperature cleanliness or the dispersibility of the lubricating oil composition.

When the mass average molecular weight (Mw) of the alkenyl group and the alkyl group is larger than 5,000, it is not possible to sufficiently secure the base number of the nitrogen-containing compound.

Here, in an aspect of the present invention, from the viewpoint of further improving the solubility in the lubricant base oil, the viewpoint of making the lubricating oil composition more excellent in the high-temperature cleanliness, and the viewpoint of further improving the base number of the nitrogen-containing compound, the mass average molecular weight (Mw) of the alkenyl group and the alkyl group is preferably 600 to 4,000, more preferably 700 to 3,000, further preferably 800 to 2,500.

In the present invention, the mass average molecular weight (Mw) and the number average molecular weight (Mn) of the alkenyl group and the alkyl group may be evaluated by the method described in Examples to be described below, regarding (A) at least one polyolefin selected from polybutene and polyisobutene, as a generation source of the alkenyl group and the alkyl group.

In formulae (1) to (4), each of $R^2$, $R^5$, $R^6$, $R^8$, $R^{10}$, and $R^{11}$ is independently an alkylene group having 2 to 5 carbon atoms.

When the alkylene group has one carbon atom, the solubility in the lubricant base oil is decreased.

Also, when the number of carbon atoms of the alkylene group is larger than 5, the high-temperature cleanliness of the lubricating oil composition may not be sufficiently secured.

Here, in an aspect of the present invention, from the viewpoint of further improving the solubility in the lubricant base oil, and the viewpoint of making the lubricating oil composition more excellent in the high-temperature cleanliness, the alkylene group preferably has 2 to 4 carbon atoms, more preferably 2 to 3 carbon atoms, and is further preferably an ethylene group.

In formula (2), $R^5$ and $R^6$ may be the same or different.

Also, in formula (4), $R^{10}$ and $R^{11}$ may be the same or different.

In formulae (1) to (4), each of m, n, p, q, and r is independently an integer of 1 to 10.

When m, n, p, q, and r are larger than 10, the solubility in the lubricant base oil is decreased.

Here, in an aspect of the present invention, from the viewpoint of further improving the solubility in the lubricant base oil, and the viewpoint of making the lubricating oil composition more excellent in the high-temperature cleanliness, m, n, p, q, and r are preferably integers of 2 to 6, and more preferably integers of 2 to 5.

Then, in the dispersant for a lubricating oil of the present invention, (A) at least one polyolefin selected from polybutene and polyisobutene satisfies at least one of the following conditions (α) and (β).

(α) a ratio (Sb/Sa) of an integrated value (Sb) of a peak present at 4.40 to 5.00 ppm in the $^1$H-NMR spectrum to an integrated value (Sa) of a peak present at 5.01 to 5.60 ppm in the $^1$H-NMR spectrum is 2 or more.

(β) a ratio (Sd/Sc) of an integrated value (Sd) of a peak present at 1.76 to 2.10 ppm in the $^1$H-NMR spectrum to an integrated value (Sc) of a peak present at 1.65 to 1.75 ppm in the $^1$H-NMR spectrum is 1 or more.

FIG. 1 illustrates an example of a $^1$H-NMR spectrum of polybutene.

In the $^1$H-NMR spectrum illustrated in FIG. 1, there are peaks belonging to terminal olefin and peaks belonging to internal olefin.

In the $^1$H-NMR spectrum illustrated in FIG. 1, among the peaks belonging to terminal olefin, peaks belonging to a terminal vinylidene group exist from 4.40 to 5.00 ppm and from 1.76 to 2.10 ppm.

Specifically, there are four peaks belonging to b, d, e, and f of the terminal vinylidene group illustrated in FIG. 1.

A peak b and a peak d belonging to b and d of the terminal vinylidene group: 4.40 to 5.00 ppm A peak e belonging to e of an allyl position methylene group of the terminal vinylidene group, and a peak f belonging to f of an allyl position methyl group of the terminal vinylidene group: 1.76 to 2.10 ppm Also, in the 1H-NMR spectrum illustrated in FIG. 1, among terminal olefins, a peak belonging to an internal vinylidene group exists from 4.40 to 5.00 ppm.

Specifically, there is one peak belonging to c of the internal vinylidene group illustrated in FIG. 1.

A peak c belonging to c of the internal vinylidene group: 4.40 to 5.00 ppm

Meanwhile, in the 1H-NMR spectrum illustrated in FIG. 1, there are peaks belonging to internal olefin from 5.01 to 5.60 ppm and from 1.65 to 1.75 ppm.

Specifically, there are three peaks belonging to a, g, and h of the internal olefin illustrated in FIG. 1.

A peak a belonging to a of the internal olefin: 5.01 to 5.60 ppm

A peak g and a peak h belonging to g and h of an allyl position methyl group of the internal olefin: 1.65 to 1.75 ppm Then, by calculating an integrated value at 5.01 to 5.60 ppm in the $^1$H-NMR spectrum, an integrated value of the peak a is calculated to obtain Sa.

By calculating an integrated value at 4.40 to 5.00 ppm in the H-NMR spectrum, the sum of integrated values of the peaks b, c, and d is calculated to obtain Sb.

By calculating an integrated value at 1.65 to 1.75 ppm in the $^1$H-NMR spectrum, the sum of integrated values of the peaks g and h is calculated to obtain Sc.

By calculating an integrated value at 1.76 to 2.10 ppm in the $^1$H-NMR spectrum, the sum of integrated values of the peaks e and f is calculated to obtain Sd.

In the present invention, (A) at least one polyolefin selected from polybutene and polyisobutene, which satisfies at least one of the following conditions, is used as a raw material.

(α) Sb/Sa is 2 or more.

(β) Sd/Sc is 1 or more.

When both the conditions are not satisfied, polyolefin with a low content of a terminal vinylidene group is used. Thus, the maleation reaction rate of the polyolefin (A) is decreased, and unreacted polyolefin increases. As a result, it is difficult to maintain or improve the high-temperature cleanliness, the base number, and the sludge dispersibility of the lubricating oil composition by adding a small amount of the dispersant for a lubricating oil (which contains at least one compound selected from the nitrogen-containing compounds represented by formulae (1) to (4), a boride of the nitrogen-containing compounds, and an acylated product of the nitrogen-containing compound), and thus it is difficult to prepare the lubricating oil composition with a low viscosity.

In an aspect of the present invention, from the viewpoint of further reducing unreacted polyolefin by further improving the maleation reaction rate, Sb/Sa in the condition (α) is preferably 10 or more, more preferably 12 or more, further preferably 14 or more, still more preferably 15 or more, still further preferably 16 or more.

Also, from the same viewpoint, Sd/Sc in the condition (β) is preferably 5 or more, more preferably 5.2 or more, further preferably 5.5 or more, still more preferably 6.0 or more.

Meanwhile, in a maleic acid compound, the olefin moiety is in an electronic poor state due to the presence of a carboxy group as an electron withdrawing group. Thus, when the polyolefin (A) is maleated, it is thought that it is desirable that the polyolefin (A) is rich in electrons. Therefore, speaking from the viewpoint of an organic electron theory, it can be said that a maleation reaction is likely to occur in polyolefin having internal olefin because an olefin moiety involved in the maleation reaction is rich in electrons, in polyolefin having internal olefin rather than polyolefin having a terminal vinylidene group.

Meanwhile, in the polyolefin containing a large amount of internal olefin, a progress of a reaction becomes difficult due to steric hindrance.

For this reason, it is difficult to predict the reaction rate of the maleation reaction.

In the present invention, regarding the reaction rate of the maleation reaction that is difficult to predict in this manner, polyolefin as a raw material is defined by using the $^1$H-NMR spectrum so that it is possible to improve the reaction rate, and reduce unreacted polyolefin. By using this, it is possible to provide the dispersant for a lubricating oil, which maintains or improves the high-temperature cleanliness, the base number, and the sludge dispersibility of the lubricating oil composition, and makes it possible to easily prepare the lubricating oil composition with a low viscosity.

[Production Method of Dispersant for Lubricating Oil]

A production method of the dispersant for a lubricating oil of the present invention includes the following reaction steps (S1) and (S2).

Reaction Step (S1): a step in which (A) at least one polyolefin selected from polybutene and polyisobutene is reacted with (B) at least one maleic acid compound selected from maleic acid and maleic anhydride Reaction Step (S2): a step in which a reaction product (X) obtained in the reaction step (S1) is reacted with (C) polyamine to obtain a nitrogen-containing compound Then, the polyolefin (A) satisfies at least one of the following conditions (α) and (β).

(α) a ratio (Sb/Sa) of an integrated value (Sb) of a peak present at 4.40 to 5.00 ppm in the $^1$H-NMR spectrum to an integrated value (Sa) of a peak present at 5.01 to 5.60 ppm in the $^1$H-NMR spectrum is 2 or more.

(β) a ratio (Sd/Sc) of an integrated value (Sd) of a peak present at 1.76 to 2.10 ppm in the $^1$H-NMR spectrum to an integrated value (Sc) of a peak present at 1.65 to 1.75 ppm in the $^1$H-NMR spectrum is 1 or more.

<Reaction Step (S1)>

In the reaction step (S1), (A) at least one polyolefin selected from polybutene and polyisobutene is reacted with (B) at least one maleic acid compound selected from maleic acid and maleic anhydride. Due to the reaction step (S1), a maleation reaction of the polyolefin (A) occurs, and at least one of alkenyl succinic anhydride and alkyl succinic anhydride is obtained as a reaction product (X).

In the production method of an aspect of the present invention, the blending ratio (B/A) of the maleic acid compound (B) to the polyolefin (A) in the reaction step (S1) is, in terms of a molar ratio, preferably 0.2 to 5, more preferably 0.75 to 2, further preferably 1 to 1.5 from the viewpoint of a high reaction product yield and a low impurity production rate.

Also, in the production method of an aspect of the present invention, the reaction temperature in the reaction step (S1) is preferably 100 to 250° C., more preferably 180 to 250° C., further preferably 200 to 250° C.

In the reaction step (S1), as for a solvent, for example, an organic solvent such as hydrocarbon oil may be used.

Also, from the viewpoint of further improving the reaction yield, a catalyst may be properly used.

<Reaction Step (S2)>

In the reaction step (S2), the reaction product (X) obtained in the reaction step (S1) is reacted with (C) polyamine to obtain a nitrogen-containing compound. At least one of alkenyl succinic anhydride and alkyl succinic anhydride, which is the reaction product (X) obtained in the reaction step (S1), is imidized or amidated through the reaction step (S2), and then, the nitrogen-containing compounds represented by formulae (1) to (4) are obtained.

The polyamine (C) is, for example, at least one kind selected from polyalkylene polyamine having a non-cyclic structure including a linear or branched alkylene group and polyalkylene polyamine having a cyclic structure, and is properly selected according to the structure of alkenyl succinimide, alkyl succinimide, alkenyl succinamide, and alkyl succinamide as a final product.

Here, it is desirable that the polyamine (C) is polyamine having a non-cyclic structure, which is represented by formulae (6) and (7).

(6)

(7)

In formulae (6) and (7), each of $R^{21}$, $R^{22}$, and $R^{23}$ is independently an alkylene group having 2 to 5 carbon atoms, preferably an alkylene group having 2 to 4 carbon atoms, more preferably an alkylene group having 2 to 3 carbon atoms, and is further preferably an ethylene group.

In formula (7), $R^{22}$ and $R^{23}$ may be the same or different.

Also, in formulae (6) and (7), t and u are integers of 1 to 10, preferably integers of 2 to 6, more preferably integers of 2 to 5.

Examples of polyalkylene polyamine having a non-cyclic structure, which is represented by formulae (6) and (7), include diethylenetriamine, triethylenetetramine, tetraethylenepentamine, pentaethylenehexamine, hexaethyleneheptamine, and hexaethylene octamine.

In the production method of an aspect of the present invention, in the reaction step (S2), the blending ratio (C/X) of the polyamine (C) to the reaction product (X) obtained in the reaction step (1) is, in terms of a molar ratio, preferably 0.2 to 5, more preferably 0.4 to 2, further preferably 0.45 to 1.9.

Also, in the production method of an aspect of the present invention, the reaction temperature in the reaction step (S2) is preferably 100 to 200° C., more preferably 110 to 190° C., further preferably 120 to 180° C.

In the reaction step (S2), as a solvent, for example, an organic solvent such as hydrocarbon oil may be used.

Here, among alkenyl succinimide, alkyl succinimide, alkenyl succinamide, and alkyl succinamide, a monoimide structure represented by formula (1), a bisimide structure represented by formula (2), a monoamide structure represented by formula (3), or a bisamide structure represented by formula (4) may be distinctively used mainly according to a charged amount of the polyamine (C) in the reaction step (2), with respect to the reaction product (X) obtained in the reaction step (1).

That is, when the blending ratio (C/X) of the polyamine (C) to the reaction product (X) is 0.80 to 1.2, in general, a monoimide structure or a monoamide structure is mainly produced.

When the blending ratio (C/X) of the polyamine (C) to the reaction product (X) is 0.4 to 0.6, in general, a bisimide structure is mainly produced.

When the blending ratio (C/X) of the polyamine (C) to the reaction product (X) is 1.8 to 2.0, in general, a bisamide structure is mainly produced.

<Reaction Step (S3A)>

The dispersant for a lubricating oil of the present invention may be a boride of the nitrogen-containing compound represented by any one of formulae (1) to (4).

The production method of an aspect of the present invention further includes the following reaction step (S3A) after the reaction steps (1) and (2).

Reaction step (S3A): a step in which the nitrogen-containing compound obtained in the reaction step (S2) is reacted with a boron compound to obtain a boride of the nitrogen-containing compound.

In the reaction step (S3A), the nitrogen-containing compounds obtained in the reaction step (S2), that is, the nitrogen-containing compounds represented by formulae (1) to (4), are reacted with the boron compound.

The boron compound is not particularly limited as long as it is a compound capable of borating the nitrogen-containing compounds represented by formulae (1) to (4), but examples thereof include boron oxide, boron halide, boric acid, boric anhydride, and boric acid ester. Boric acid is preferred.

In the production method of an aspect of the present invention, in the reaction step (S3A), the blending ratio of the nitrogen-containing compound and the boron compound (boron compound/nitrogen-containing compound) is, in terms of a molar ratio, preferably 0.05 to 5, more preferably 0.1 to 4.

Also, in the production method of an aspect of the present invention, the reaction temperature in the reaction step (S3A) is preferably 50 to 200° C., more preferably 100 to 180° C.

In the reaction step (S3A), as a solvent, for example, an organic solvent such as hydrocarbon oil may be used.

<Reaction Step (S3B)>

The dispersant for a lubricating oil of the present invention may be acylated products of the nitrogen-containing compounds represented by formulae (1) to (4).

The production method of an aspect of the present invention further includes the following reaction step (S3B) after the reaction steps (1) and (2).

Reaction step (S3B): a step in which the nitrogen-containing compound obtained in the reaction step (S2) is reacted with a carboxylic acid compound to obtain an acylated product of the nitrogen-containing compound.

In the reaction step (S3B), the nitrogen-containing compounds obtained in the reaction step (S2), that is, the nitrogen-containing compounds represented by formulae (1) to (4), are reacted with the carboxylic acid compound.

The carboxylic acid compound is not particularly limited as long as it is a compound capable of acylating the nitrogen-containing compounds represented by formulae (1) to (4), but examples thereof include formic acid (methanoic acid), acetic acid (ethanoic acid), acetic anhydride, propionic acid (propanoic acid), butyric acid (butanoic acid), valeric acid (pentanoic acid), caproic acid (hexanoic acid), enanthic acid (heptanoic acid), caprylic acid (octanoic acid), pelargonic acid (nonanoic acid), capric acid (decanoic acid), undecanoic acid, lauric acid (dodecanoic acid), tridecylic acid (tridecanoic acid), myristic acid (tetradecanoic acid), pentadecylic acid (pentadecanoic acid), palmitic acid (hexadecanoic acid), margaric acid (heptadecanoic acid), and stearic acid (octadecanoic acid).

In the production method of an aspect of the present invention, in the reaction step (S3B), the blending ratio of the nitrogen-containing compound and the carboxylic acid compound (carboxylic acid compound/nitrogen-containing compound) is, in terms of a molar ratio, preferably 0.05 to 5, more preferably 0.1 to 4.

Also, in the production method of an aspect of the present invention, the reaction temperature in the reaction step (S3B) is preferably 50 to 200° C., more preferably 100 to 180° C.

In the reaction step (S3B), as a solvent, for example, an organic solvent such as hydrocarbon oil may be used.

[Lubricating Oil Composition]

The lubricating oil composition of the present invention contains the dispersant for a lubricating oil, and the lubricant base oil.

As compared to a conventional nitrogen-containing compound-containing dispersant for a lubricating oil, the dispersant for a lubricating oil contains a small amount of unreacted polyolefin, and thus contains a relatively large amount of a nitrogen-containing compound as an active ingredient. Thus, it is possible to reduce the content of the dispersant for a lubricating oil, in the lubricating oil composition, and it is easy to prepare the lubricating oil composition with a low viscosity.

In the dispersant for a lubricating oil of an aspect of the present invention, the content of at least one compound (hereinafter, also referred to as an "active ingredient") selected from the nitrogen-containing compound represented by any one of formulae (1) to (4), a boride of the nitrogen-containing compound, and an acylated product of the nitrogen-containing compound, including unreacted polyolefin, is preferably 50 to 100% by mass, more preferably 60 to 100% by mass, further preferably 70 to 100% by mass, still more preferably 80 to 100% by mass, still further preferably 90 to 100% by mass, with respect to the total amount (100% by mass) of an ashless detergent for a lubricating oil.

As compared to a conventional dispersant for a lubricating oil, the dispersant for a lubricating oil of the present invention contains a small amount of unreacted polyolefin, and thus contains a relatively large amount of an active ingredient. Therefore, even through addition of a small amount, the active ingredient concentration may be sufficiently increased, and then the high-temperature cleanliness, the base number, and the sludge dispersibility of the lubricating oil composition may be maintained or improved. Also, the lubricating oil composition with a low viscosity may be easily prepared, and the lubricating oil composition excellent in the fuel saving property may be easily prepared.

In the lubricating oil composition of an aspect of the present invention, from these viewpoints, the content of the dispersant for a lubricating oil is preferably 0.01 to 30% by mass, more preferably 0.1 to 20% by mass, further preferably 0.5 to 10% by mass, still more preferably 1 to 8% by mass, still further preferably 2 to 6% by mass with respect to the total amount (100% by mass) of the lubricating oil composition.

<Lubricant Base Oil>

The lubricant base oil used in the lubricating oil composition of the present invention is not particularly limited, and at least one kind selected from mineral oils and synthetic oils which may be used as the lubricant base oil may be used.

Examples of the mineral oil include: atmospheric-pressure residual oils obtained through atmospheric pressure distillation of crude oils such as paraffinic crude oil, intermediate crude oil, and naphthenic crude oil; distillates obtained through distillation of these atmospheric-pressure residual oils under reduced pressure; and mineral oils obtained by subjecting the distillates to one or more refining treatments such as solvent deasphalting, solvent extraction, hydrocracking, solvent dewaxing, contact dewaxing, and hydrorefining.

These mineral oils may be used alone or in combination of two or more kinds thereof.

Also, the mineral oil may be one classified into any of groups 1, 2, and 3 in a base oil category of API (American Petroleum Institute), but is preferably classified into groups 2 and 3 from the viewpoint of further suppressing sludge generation, and further improving the stability against an oxidative deterioration and a viscosity property.

Examples of the synthetic oil include: poly α-olefins such as α-olefin homopolymer, and α-olefin copolymer (for example, ethylene-α-olefin copolymer, etc.); various ester oils such as polyester, dibasic acid ester, and phosphoric acid ester; various ethers such as polyphenyl ether; polyglycol; alkylbenzene; alkyl naphthalene; and synthetic oils obtained by isomerizing wax (GTL wax (Gas To Liquids WAX)) produced by a Fischer-Tropsch method, etc.

As for the lubricant base oil, the mineral oils may be used alone or in combination of a plurality of kinds thereof. Also, the synthetic oils may be used alone or in combination of a plurality of kinds thereof. Also, one or more kinds of the mineral oil and one or more kinds of the synthetic oil may be used in combination.

The kinematic viscosity and the viscosity index of the lubricant base oil are not particularly limited. However, from the viewpoint of making the lubricating oil composition more excellent in the high-temperature cleanliness, the base number, and the sludge dispersibility, and making the lubricant base oil better in the handling property, it is desirable that the kinematic viscosity and the viscosity index fall within the following ranges.

That is, the kinematic viscosity of the lubricant base oil (D) at 100° C. (hereinafter, also referred to as "100° C. kinematic viscosity") is preferably 1 to 50 mm$^2$/s, more preferably 2 to 20 mm$^2$/s, further preferably 3 to 15 mm$^2$/s.

The kinematic viscosity of the lubricant base oil (D) at 40° C. (hereinafter, also referred to as "40° C. kinematic viscosity") is preferably 1 to 200 mm$^2$/s, more preferably 5 to 160 mm$^2$/s, further preferably 10 to 130 mm$^2$/s.

The viscosity index of the lubricant base oil (D) is preferably 80 or more, more preferably 90 or more, further preferably 100 or more.

In the present specification, the kinematic viscosity, and the viscosity index are values measured or calculated by using a capillary viscometer made of glass, in accordance with JIS K 2283:2000.

<Alkyl-Substituted Hydroxy Aromatic Ester Derivative>

It is desirable that the lubricating oil composition of an aspect of the present invention further contains an alkyl-substituted hydroxy aromatic ester derivative in addition to the dispersant for a lubricating oil and the lubricant base oil. When the alkyl-substituted hydroxy aromatic ester derivative is contained, the high-temperature cleanliness and the sludge dispersibility of the lubricating oil composition are further improved.

Examples of the alkyl-substituted hydroxy aromatic ester derivative include a compound represented by formula (5).

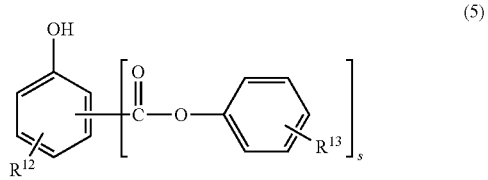

(5)

In formula (5), each of $R^{12}$ and $R^{13}$ is independently an alkyl group or an alkenyl group having 6 to 24 carbon atoms, and s is 1 or 2.

Here, from the viewpoint of the solubility in the lubricant base oil, and the viewpoint of the performance per mass to be added, $R^{12}$ and $R^{13}$ in formula (5) are preferably an alkyl group or an alkenyl group having 10 to 18 carbon atoms, more preferably an alkyl group or an alkenyl group having 10 to 16 carbon atoms, further preferably an alkyl group or an alkenyl group having 12 to 16 carbon atoms.

Examples of the alkyl-substituted hydroxy aromatic ester derivative represented by formula (5) include (hexylhydroxybenzoic acid) hexylphenyl ester, (hexylhydroxybenzoic acid) dodecylphenyl ester, (octylhydroxybenzoic acid) octylphenyl ester, (nonylhydroxybenzoic acid) nonylphenyl ester, (nonylhydroxybenzoic acid) hexadecylphenyl ester, (dodecylhydroxybenzoic acid) nonylphenyl ester, (dodecylhydroxybenzoic acid) dodecylphenyl ester, (dodecylhydroxybenzoic acid) hexadecylphenyl ester, (hexadecylhydroxybenzoic acid) hexylphenyl ester, (hexadecylhydroxybenzoic acid) dodecylphenyl ester, (tetradecylhydroxybenzoic acid) tetradecylphenyl ester, (hexadecylhydroxybenzoic acid) hexadecylphenyl ester, (eicosylhydroxybenzoic acid) eicosylphenyl ester, and (dodecylsalicylic acid) dodecylphenyl ester. (Dodecylsalicylic acid) dodecylphenyl ester is preferred.

In the lubricating oil composition of an aspect of the present invention, the content of the alkyl-substituted hydroxy aromatic ester derivative is preferably 1 to 10% by mass, more preferably 1 to 5% by mass, further preferably 1 to 3% by mass with respect to the total amount (100% by mass) of the lubricating oil composition.

The blending ratio of the alkyl-substituted hydroxy aromatic ester derivative and the dispersant for a lubricating oil (the alkyl-substituted hydroxy aromatic ester derivative/the dispersant for a lubricating oil) is, in terms of a mass ratio, 1/99 to 99/1, preferably 10/90 to 90/10, more preferably 20/80 to 80/20.

<Other Additives>

The lubricating oil composition of an aspect of the present invention may contain components other than the dispersant for a lubricating oil and the alkyl-substituted hydroxy aromatic ester derivative in a range where the effect of the present invention is not impaired.

As for the other components, an antioxidant, an anti-wear agent, a friction modifier, an extreme pressure agent, another dispersant, a viscosity index improver, a pour point improver, a metal deactivator, a rust inhibitor, an anti-foaming agent, a demulsifier, a colorant, and other additives, which are generally blended with the lubricating oil composition, may be exemplified. Among these, one kind may be used alone or two or more kinds may be used in combination.

[Various Physical Properties of Lubricating Oil Composition]

In the lubricating oil composition of an aspect of the present invention, from the viewpoint of further improving the high-temperature cleanliness, the base number, and the sludge dispersibility of the lubricating oil composition, it is desirable that the 100° C. kinematic viscosity, the 40° C. kinematic viscosity, and the viscosity index fall within ranges to be described below. The 40° C. kinematic viscosity, the 100° C. kinematic viscosity, and the viscosity index of the lubricating oil composition are values measured and calculated in accordance with JIS K 2283-2000.

<100° C. Kinematic Viscosity of Lubricating Oil Composition>

In the lubricating oil composition of an aspect of the present invention, the 100° C. kinematic viscosity is preferably 3 to 20 mm$^2$/s, more preferably 4 to 15 mm$^2$/s, further preferably 5 to 15 mm$^2$/s.

<40° C. Kinematic Viscosity of Lubricating Oil Composition>

In the lubricating oil composition of an aspect of the present invention, the 40° C. kinematic viscosity is preferably 30 to 150 mm$^2$/s, more preferably 40 to 140 mm$^2$/s, further preferably 50 to 130 mm$^2$/s.

<Viscosity Index of Lubricating Oil Composition>

In the lubricating oil composition of an aspect of the present invention, the viscosity index is preferably 90 or more, more preferably 100 or more, further preferably 105 or more.

[Use of Lubricating Oil Composition]

The lubricating oil composition of an aspect of the present invention is preferably used in a combustion engine such as a gasoline engine or a diesel engine.

The dispersant for a lubricating oil of an aspect of the present invention, which is contained in the lubricating oil composition of the present invention, is excellent in the high-temperature cleanliness and the base number of the lubricating oil composition, and thus can also exhibit a function as a detergent. Therefore, when a metal-based detergent is used in combination, the amount of the metal-based detergent to be used may be reduced. Specifically, a clogging problem of filters of an exhaust gas treatment device may be suppressed so that life extension of the exhaust gas treatment device may be achieved, and a combustion engine may be satisfactorily operated for a long period of time.

Also, the dispersant for a lubricating oil, which is contained in the lubricating oil composition of the present invention, has a low content of unreacted polyolefin, and thus, through addition of a small amount, a sufficient amount of active ingredient may be contained in the lubricating oil composition. Therefore, it is easy to prepare the lubricating oil composition with a low viscosity, and it is easy to prepare the lubricating oil composition excellent in the fuel saving property.

Furthermore, even when the addition amount of the dispersant for a lubricating oil, which is contained in the lubricating oil composition of the present invention, is a small amount, the addition amount of the active ingredient may be higher than ever before. Therefore, it is possible to maintain cleanliness of the lubricating oil composition for a long period of time, and to allow easy preparation of the lubricating oil composition with a low viscosity by at least one of effects that an amount of the active ingredient functioning as a detergent may be higher than ever before, and the active ingredient may disperse more sludge, its precursor, or the like, thereby reducing a substance to be neutralized by the detergent.

The lubricating oil composition is suitably used for not only the combustion engine, but also gear oil such as automobile gear oil for gasoline automobiles, hybrid automobiles, electric automobiles, etc., and industrial gear oil for other general machinery, etc. and also hydraulic machines, turbines, compressors, machine tools, cutting machines, toothed wheels (gears), machines equipped with fluid bearings, and rolling bearings, etc.

Therefore, in an aspect of the present invention, a combustion engine filled with the lubricating oil composition may be exemplified. As for the combustion engine, a gasoline engine and/or a diesel engine may be exemplified.

Also, in an aspect of the present invention, a driving system mechanism, industrial equipment or the like, which is filled with the lubricating oil composition, may be exemplified.

Therefore, in an aspect of the present invention, a combustion engine filled with the lubricating oil composition may be exemplified. As for the combustion engine, a gasoline engine and/or a diesel engine may be exemplified.

Also, in an aspect of the present invention, industrial equipment, a driving system mechanism, or the like, which is filled with the lubricating oil composition, may be exemplified.

EXAMPLE

The present invention will be specifically described by the following Examples, but the present invention is not limited by the following Examples.

[Measurement Method of Values of Physical Properties]

The measurement method of values of physical properties, which was carried out in production examples to be described below, is as follows.

<Mass Average Molecular Weight (Mw) and Number Average Molecular Weight (Mn)>

The mass average molecular weight (Mw) and the number average molecular weight (Mn) of polybutene used as a raw material were measured under the following conditions, and evaluated as a mass average molecular weight (Mw) and a number average molecular weight (Mn) in terms of standard polystyrene.

SEC device: HLC-8220GPC manufactured by Tosoh
Column: TSKguardcolumn HXL-H+TSKgel GMH-XL (two)+G2000H-XL (one) manufactured by Tosoh
Solvent: tetrahydrofuran (manufactured by Wako Pure Chemical Industries, stabilizer-free, special grade)
Detector: differential refractive index (RI) detector, UV detector
Concentration: 0.1 w/v %
Injection volume: 100 μl
Flow velocity: 1.0 ml/min
Column temperature: 40° C.
Standard sample for calibration curve: TSK standard polystyrene manufactured by Tosoh
Analysis software: GPC-8020model2

<1H-Nmr Spectrum>

The 1H-NMR spectrum of polybutene used as a raw material was measured under the following conditions.

NMR device: DRX500 manufactured by Bruker•Biospin
Spectrometer: AVANCE III HD manufactured by Bruker•Biospin
Probe: 5 mmφ TCI CryoProbe
Number of data points: 64 k
Number of times of dummy scanning: twice
Cumulative number of times: 64 times
Observation center: 6.175 ppm
Observation width: 20 ppm
Acquisition time: 3.28 sec
Relaxation delay: 10 sec
NMR sample tube: 5 mmφ
Sample amount: 5 to 15 mg
Measurement solvent: deuterated chloroform
Measurement temperature: room temperature In the following description, integrated values of various peaks observed in the $^1$H-NMR spectrum are referred to as follows.

An integrated value of a peak present at 5.01 to 5.60 ppm: Sa
An integrated value of a peak present at 4.40 to 5.00 ppm: Sb
An integrated value of a peak present at 1.65 to 1.75 ppm: Sc
An integrated value of a peak present at 1.76 to 2.10 ppm: Sd "The integrated value of a peak present at 4.40 to 5.00 ppm" to "the integrated value of a peak present at 5.01 to 5.60 ppm" is also referred to as "Sb/Sa."

"The integrated value of a peak present at 1.76 to 2.10 ppm" to "the integrated value of a peak present at 1.65 to 1.75 ppm" is also referred to as "Sd/Sc."

<Saponification Value>

The saponification value of the product was measured in accordance with JIS K 2503-2010.

<Base Number>

The base number of the product was measured by a hydrochloric acid method based on JIS K 2501 2003.

<Kinematic Viscosity, Viscosity Index>

The 40° C. kinematic viscosity, the 100° C. kinematic viscosity, and the viscosity index of a lubricant base oil and a lubricating oil composition were measured or calculated by using a capillary viscometer made of glass in accordance with JIS K 2283:2000.

The 100° C. kinematic viscosity of the product was measured in accordance with JIS K 2283-2000.

Production Examples 1 to 4 and Comparative Production Examples 1 to 4

Polybutenyl succinic anhydrides C1 to C4 and polybutenyl succinic anhydrides D1 to D4 were prepared by Production Examples 1 to 4 and Comparative Production Examples 1 to 4 to be described below.
Details of polybutenes A1 to A4 and polybutenes B1 to B4 used as raw materials are noted in Table 1 to be described below.

Production Example 1

Into a 500 mL autoclave, 240 g (about 0.24 mol) of polybutene A1, 0.3 g (0.001 mol) of cetyl bromide, and 25.9 g (0.264 mol) of maleic anhydride were put, nitrogen substitution was performed, and a reaction was carried out at 240° C. for 5 h. Then, the temperature was lowered to 210° C., and unreacted maleic anhydride and cetyl bromide were removed through distillation under reduced pressure. Then, the temperature was lowered to 140° C., and polybutenyl succinic anhydride C1 was obtained through pressure filtration.
The yield of polybutenyl succinic anhydride C1 was 247 g, and the saponification value was 97 mgKOH/g.

Production Example 2

Polybutene A1 was changed to polybutene A2, and then polybutenyl succinic anhydride C2 was obtained in the same manner as in Production Example 1.
The charged amount of polybutene A2 was 240 g (about 0.24 mol).
The yield of polybutenyl succinic anhydride C2 was 249 g, and the saponification value was 96 mgKOH/g.

Production Example 3

Polybutene A1 was changed to polybutene A3, and the charged amount of polybutene A3 was changed to 312 g (about 0.24 mol), and then polybutenyl succinic anhydride C3 was obtained in the same manner as in Production Example 1.
The yield of polybutenyl succinic anhydride C3 was 315 g, and the saponification value was 74 mgKOH/g.

Production Example 4

Polybutene A1 was changed to polybutene A4, the charged amount of polybutene A4 was changed to 276 g (about 0.12 mol), the charged amount of cetyl bromide was changed to 0.15 g (0.0005 mol), the charged amount of maleic anhydride was changed to 12.9 g (0.132 mol), and then polybutenyl succinic anhydride C4 was obtained in the same manner as in Production Example 1.
The yield of polybutenyl succinic anhydride C4 was 272 g, and the saponification value was 40 mgKOH/g.

Comparative Production Example 1

Polybutene A1 was changed to polybutene B1, and then polybutenyl succinic anhydride D1 was obtained in the same manner as in Production Example 1.
The charged amount of polybutene B1 was 240 g (about 0.24 mol).
The yield of polybutenyl succinic anhydride D1 was 246 g, and the saponification value was 70 mgKOH/g.

Comparative Production Example 2

Polybutene A2 was changed to polybutene B2, and polybutenyl succinic anhydride D2 was obtained in the same manner as in Production Example 2.
The charged amount of polybutene B2 was 240 g (about 0.24 mol).
The yield of polybutenyl succinic anhydride D2 was 252 g, and the saponification value was 68 mgKOH/g.

Comparative Production Example 3

Polybutene A3 was changed to polybutene B3, and the charged amount of polybutene B3 was changed to 312 g (about 0.24 mol), and then polybutenyl succinic anhydride D3 was obtained in the same manner as in Production Example 3.
The yield of polybutenyl succinic anhydride D3 was 318 g, and the saponification value was 52 mgKOH/g.

Comparative Production Example 4

Polybutene A4 was changed to polybutene B4, and the charged amount of polybutene B4 was changed to 275 g (about 0.12 mol), and then polybutenyl succinic anhydride D4 was obtained in the same manner as in Production Example 4.
The yield of polybutenyl succinic anhydride D4 was 275 g, and the saponification value was 27 mgKOH/g.
Details of polybutenes A1 to A4 and polybutenes B1 to B4 used as raw materials, and saponification values of polybutenyl succinic anhydrides C1 to C4 and polybutenyl succinic anhydrides D1 to D4 are noted in Table 1.

TABLE 1

| | | Production Example 1 | Production Example 2 | Production Example 3 | Production Example 4 | Comparative Production Example 1 | Comparative Production Example 2 | Comparative Production Example 3 | Comparative Production Example 4 |
|---|---|---|---|---|---|---|---|---|---|
| Raw material polybutene | Type | A1 | A2 | A3 | A4 | B1 | B2 | B3 | B4 |
| | Mass average molecular weight | 1000 | 1000 | 1300 | 2300 | 1000 | 1000 | 1300 | 2300 |
| | Molecular weight distribution (Mw/Mn) | 1.477 | 1.632 | 1.583 | 1.630 | 2.037 | 1.863 | 1.926 | 2.056 |
| | Sb/Sa | 31.2 | 15.6 | 33.8 | 29.5 | 0.4 | 0.2 | 0.4 | 1.7 |
| | Sd/Sc | 22.5 | 6.4 | 26.1 | 19.2 | 0.4 | 0.4 | 1> | 1> |
| Polybutenyl succinic anhydride | Type | C1 | C2 | C3 | C4 | D1 | D2 | D3 | D4 |
| | Saponification Value (mgKOH/g) | 97 | 96 | 74 | 40 | 70 | 68 | 52 | 27 |

From Table 1, the followings may be found.

When polybutenyl succinic anhydrides C1 to C2 obtained in Production Examples 1 to 2, with a mass average molecular weight of 1,000, are compared to polybutenyl succinic anhydrides D1 to D4 obtained in Comparative Production Examples 1 to 4, it is thought that polybutenyl succinic anhydrides C1 to C2 have higher saponification values and thus have higher maleation reaction rates and smaller amounts of unreacted polybutene.

A similar trend was also observed in a comparison between polybutenyl succinic anhydride C3 obtained in Production Example 3, with a mass average molecular weight of 1,300, and polybutenyl succinic anhydride D3 obtained in Comparative Production Example 3, and a comparison between polybutenyl succinic anhydride C4 obtained in Production Example 4, with a mass average molecular weight of 2,300, and polybutenyl succinic anhydride D4 obtained in Comparative Production Example 4.

Production Examples 5 to 8 and Comparative Production Examples 5 to 8

Polybutenyl succinimides E1 to E4 and polybutenyl succinimides F1 to F4 were prepared by Production Examples 5 to 8 and Comparative Production Examples 5 to 8 to be described below.

Production Example 5

Into a 1 L separable flask, 50 g (about 0.043 mol) of polybutenyl succinic anhydride C1 obtained in Production Example 1, 3.5 g (0.024 mol) of triethylenetetramine (TETA), 2.5 g (0.024 mol) of diethylenetriamine (DETA), and 19 g of mineral oil (mineral oil of a 150 neutral fraction, 100° C. kinematic viscosity: 5.3 mm$^2$/s) were put, and a reaction was carried out at 150° C. for 4 h under a nitrogen stream. Then, the temperature was raised to 200° C., and unreacted TETA and DETA and produced water were removed through distillation under reduced pressure. Then, the temperature was lowered to 140° C., and polybutenyl succinimide E1 was obtained through pressure filtration.

The yield of polybutenyl succinimide E1, including mineral oil, was 71 g, the base number was 49.9 mgKOH/g, and the 100° C. kinematic viscosity was 277 mm$^2$/s.

Production Example 6

Polybutenyl succinic anhydride C1 was changed to polybutenyl succinic anhydride C2 obtained in Production Example 2, and polybutenyl succinimide E2 was obtained in the same manner as in Production Example 5.

The charged amount of polybutenyl succinic anhydride C2 was 50 g (about 0.043 mol).

The yield of polybutenyl succinimide E2, including mineral oil, was 70 g, the base number was 50.3 mgKOH/g, and the 100° C. kinematic viscosity was 276 mm$^2$/s.

Production Example 7

Polybutenyl succinic anhydride C1 was changed to polybutenyl succinic anhydride C3 obtained in Production Example 3, the charged amount of triethylenetetramine (TETA) was changed to 2.6 g (0.018 mol), the charged amount of diethylenetriamine (DETA) was changed to 1.8 g (0.018 mol), and polybutenyl succinimide E3 was obtained in the same manner as in Production Example 5.

The charged amount of polybutenyl succinic anhydride C3 was 50 g (about 0.033 mol).

The yield of polybutenyl succinimide E3, including mineral oil, was 67 g, the base number was 34.0 mgKOH/g, and the 100° C. kinematic viscosity was 317 mm$^2$/s.

Production Example 8

Polybutenyl succinic anhydride C1 was changed to polybutenyl succinic anhydride C4 obtained in Production Example 4, the charged amount of triethylenetetramine (TETA) was changed to 1.5 g (0.010 mol), the charged amount of diethylenetriamine (DETA) was changed to 1.0 g (0.010 mol), and then polybutenyl succinimide E4 was obtained in the same manner as in Production Example 5.

The charged amount of polybutenyl succinic anhydride C4 was 50 g (about 0.018 mol).

The yield of polybutenyl succinimide E4, including mineral oil, was 64 g, the base number was 22.2 mgKOH/g, and the 100° C. kinematic viscosity was 486 mm$^2$/s.

Comparative Production Example 5

Polybutenyl succinic anhydride C1 was changed to polybutenyl succinic anhydride D1 obtained in Comparative Production Example 1, the charged amount of triethylenetetramine (TETA) was changed to 2.5 g (0.017 mol), the charged amount of diethylenetriamine (DETA) was changed to 1.8 g (0.017 mol), the charged amount of mineral oil was changed to 18 g, and then polybutenyl succinimide F1 was obtained in the same manner as in Production Example 5.

The yield of polybutenyl succinimide F1, including mineral oil, was 68 g, the base number was 38.4 mgKOH/g, and the 100° C. kinematic viscosity was 282 mm$^2$/s.

Comparative Production Example 6

Polybutenyl succinic anhydride D1 was changed to polybutenyl succinic anhydride D2 obtained in Comparative Production Example 2, and polybutenyl succinimide F2 was obtained in the same manner as in Comparative Production Example 5.

The charged amount of polybutenyl succinic anhydride D2 was 50 g (about 0.030 mol).

The yield of polybutenyl succinimide F2, including mineral oil, was 67 g, the base number was 37.9 mgKOH/g, and the 100° C. kinematic viscosity was 289 mm$^2$/s.

Comparative Production Example 7

Polybutenyl succinic anhydride D1 was changed to polybutenyl succinic anhydride D3 obtained in Comparative Production Example 3, the charged amount of triethylenetetramine (TETA) was changed to 1.9 g (0.013 mol), the charged amount of diethylenetriamine (DETA) was changed to 1.3 g (0.013 mol), and then polybutenyl succinimide F3 was obtained in the same manner as in Comparative Production Example 5.

The charged amount of polybutenyl succinic anhydride D3 was 50 g (about 0.023 mol).

The yield of polybutenyl succinimide F3, including mineral oil, was 64 g, the base number was 27.1 mgKOH/g, and the 100° C. kinematic viscosity was 313 mm$^2$/s.

Comparative Production Example 8

Polybutenyl succinic anhydride D3 was changed to polybutenyl succinic anhydride D4 obtained in Comparative Production Example 4, and then polybutenyl succinimide F4 was obtained in the same manner as in Comparative Production Example 7.

The charged amount of polybutenyl succinic anhydride D4 was 50 g (about 0.023 mol).

The yield of polybutenyl succinimide F4, including mineral oil, was 61 g, the base number was 16.2 mgKOH/g, and the 100° C. kinematic viscosity was 494 mm$^2$/s.

Table 2 illustrates the base number and the 100° C. kinematic viscosity of evaluation oils obtained by diluting polybutenyl succinimides E1 to E4 and polybutenyl succinimides F1 to F4 with mineral oil of a 150 neutral fraction (40° C. kinematic viscosity: 31.38 mm$^2$/s, 100° C. kinematic viscosity: 5.40 mm$^2$/s, viscosity index=105, sulfur content=less than 2 mass ppm).

The dilution rate by the mineral oil was set such that polybutenyl succinimides whose raw materials (polybutenes) have the same mass average molecular weights have the same dilution rates.

TABLE 2

| | | Production Example 5 | Production Example 6 | Production Example 7 | Production Example 8 | Comparative Production Example 5 | Comparative Production Example 6 | Comparative Production Example 7 | Comparative Production Example 8 |
|---|---|---|---|---|---|---|---|---|---|
| Raw material | Polybutenyl succinic anhydride | C1 | C2 | C3 | C4 | D1 | D2 | D3 | D4 |
| | Polyethylene polyamine | TETA/DETA | TETA/DETA | TETA/DETA | TETA/DETA | TETA/DETA | TETA/DETA | TETA/DETA | TETA/DETA |
| | Mineral oil % by mass (150 neutral) | 25 | 25 | 26 | 26 | 25 | 25 | 26 | 26 |
| | Number average molecular weight | 1000 | 1000 | 1300 | 2300 | 1000 | 1000 | 1300 | 2300 |
| Polybutenyl succinimide | Type | E1 | E2 | E3 | E4 | F1 | F2 | F3 | F4 |
| | Base number mgKOH/g | 49.9 | 50.3 | 34.0 | 22.2 | 38.4 | 37.9 | 27.1 | 16.2 |
| | Kinematic viscosity mm$^2$/s | 277 | 276 | 317 | 486 | 282 | 289 | 313 | 494 |

From the results noted in Table 2, the followings may be found.

When polybutenyl succinimide E1 of Production Example 5 and polybutenyl succinimide E2 of Production Example 6, in which the mass average molecular weight of raw material polybutene is 1,000, are compared to polybutenyl succinimide F1 of Comparative Production Example 5, and polybutenyl succinimide F2 of Comparative Production Example 6, it can be found that base numbers of polybutenyl succinimide E1 and polybutenyl succinimide E2 may be made extremely high.

Also, a similar trend was also observed in a case where polybutenyl succinimide E3 of Production Example 7, in which the mass average molecular weight of raw material polybutene is 1,300, is compared to polybutenyl succinimide F3 of Comparative Production Example 7, and in a case where polybutenyl succinimide E4 of Production Example 8, in which the mass average molecular weight of raw material polybutene is 2,300, is compared to polybutenyl succinimide F4 of Comparative Production Example 8.

From these results, it can be found that even when a small amount of polybutenyl succinimides E1 to E4 obtained in Production Examples 5 to 8 is added, it is easy to sufficiently secure the concentration of an active ingredient as a dispersant in a lubricating oil composition, and it is easy to prepare the lubricating oil composition with a low viscosity.

Production Examples 9 to 12

Borated polybutenyl succinimides E5 to E6 and acylated polybutenyl succinimides E7 to E8 were prepared by Production Examples 9 to 12 to be described below.

Production Example 9

Into a 200 mL separable flask, 50 g (about 0.021 mol) of diluted polybutenyl succinimide E1 obtained in Production Example 5, and 5.8 g (0.094 mol) of boric acid were put, and a reaction was carried out at 150° C. for 4 h under a nitrogen stream. Then, produced water was removed through distillation at 150° C. under reduced pressure, and then borated polybutenyl succinimide E5 was obtained through pressure filtration.

The yield of borated polybutenyl succinimide E5 was 50 g, the base number was 47.2 mgKOH/g, and the boron content was 1.9% by mass.

Production Example 10

The charged amount of boric acid was set to 2.9 g (0.047 mol), and then borated polybutenyl succinimide E6 was obtained in the same manner as in Production Example 9.

The yield of borated polybutenyl succinimide E6 was 50 g, the base number was 48.0 mgKOH/g, and the boron content was 1.0% by mass.

Production Example 11

Into a 200 mL separable flask, 50 g (about 0.021 mol) of diluted polybutenyl succinimide E1 obtained in Production Example 5, and 8.5 g (0.0425 mol) of lauric acid were put, a reaction was carried out at 160° C. for 5 h under a nitrogen stream, and then acylated polybutenyl succinimide E7 was obtained.

The yield of acylated polybutenyl succinimide E7 was 57 g, and the base number was 1.9 mgKOH/g.

Production Example 12

Into a 200 mL separable flask, 50 g (about 0.021 mol) of diluted polybutenyl succinimide E1 obtained in Production Example 5, and 4.3 g (0.0425 mol) of acetic anhydride were put, a reaction was carried out at 140° C. for 5 h under a nitrogen stream, and then, residual acetic acid was removed through distillation under reduced pressure to obtain acylated polybutenyl succinimide E8.

The yield of acylated polybutenyl succinimide E8 was 53 g, and the base number was 5.3 mgKOH/g.

Table 3 illustrates the base number of evaluation oils obtained by diluting borated polybutenyl succinimides E5 and E6, and acylated polybutenyl succinimides E7 and E8 with mineral oil of a 150 neutral fraction (40° C. kinematic viscosity: 31.38 mm$^2$/s, 100° C. kinematic viscosity: 5.40 mm$^2$/s, viscosity index=105, sulfur content=less than 2 mass ppm).

TABLE 3

|  |  | Production Example 9 (E5) | Production Example 10 (E6) | Comparative Production Example 11 (E7) | Comparative Production Example 12 (E8) |
|---|---|---|---|---|---|
| Raw material | Polybutenyl succinimide | C1 | C2 | C3 | C4 |
|  | Boron compound | Boric acid | Boric acid | — | — |
|  | Carboxylic acid compound | — | — | Lauric acid | Acetic anhydride |
| Borated polyalkenyl succinimide Acylated polyalkenyl succinimide | B content    % by mass | 1.9 | 1.0 | — | — |
|  | Base number  mgKOH/g | 47.2 | 48.0 | 1.9 | 5.3 |

Examples 1 to 10 and Comparative Examples 1 to 4

Lubricating oil compositions of Examples 1 to 10 and Comparative Examples 1 to 4 to be described below were prepared, and a hot tube test was carried out.

Examples 1 to 4 and Comparative Examples 1 to 4

Mineral oil of a 500 neutral fraction (40° C. kinematic viscosity: 90.11 mm$^2$/s, 100° C. kinematic viscosity: 11.04 mm$^2$/s, viscosity index=108, sulfur content=less than 5 mass ppm) was blended with 5% by mass of polyalkenyl succinimides E1 to E4 obtained in Production Examples 5 to 8 and polyalkenyl succinimides F1 to F4 obtained in Comparative Production Examples 5 to 8 to prepare lubricating oil compositions. The performance of these lubricating oil compositions was evaluated by a hot tube test (230° C.). Table 4 illustrates properties and evaluation results of the lubricating oil compositions.

Examples 5 to 8

Lubricating oil compositions were prepared in the same manner as in Example 1 except that borated polyalkenyl succinimides E5 to E6 and acylated polyalkenyl succinimides E7 to E8 obtained in Production Examples 9 to 12 were used. The performance of these lubricating oil compositions was evaluated by a hot tube test (250° C.). Table 5 illustrates evaluation results.

Examples 9 and 10

Mineral oil of a 500 neutral fraction (40° C. kinematic viscosity: 90.11 mm$^2$/s, 100° C. kinematic viscosity: 11.04 mm$^2$/s, viscosity index=108, sulfur content=less than 5 mass ppm) was blended with 2% by mass of dodecylsalicylic acid dodecylphenyl ester and 5% by mass of borated polyalkenyl succinimides E5 to E6 obtained in Production Examples 9 to 10 to prepare lubricating oil compositions. The performance of these lubricating oil compositions was evaluated by a hot tube test (270° C.). Table 6 illustrates evaluation results.

<Evaluation Method>

A hot tube test was performed in accordance with JPI-5S-55-99. Specifically, in a glass tube with an inner diameter of 2 mm, while the temperature of the glass tube was maintained at 230° C., 250° C., or 270° C., the lubricating oil composition of each of Examples and Comparative Examples, at 0.3 mL/h, and air, at 10 mL/min, were allowed to continuously flow into the glass tube for 16 h. Then, the following evaluations were performed.

(1) Hot Tube Test Score

After the hot tube test, lacquer adhering to the inside of the glass tube was compared to a color sample. 11 levels of scores were given (10 points for a case of colorless and transparent, and 0 points for a case of black). The higher the transparency, the higher the score, which indicates that cleanliness and stability, and sludge dispersibility at a high temperature are high.

The hot tube test score may be 4 or more, preferably 5 or more, more preferably 6 or more, further preferably 9 or more, still further preferably 10.

(2) Deposition Amount

After the hot tube test, an increase amount in the mass of the glass tube before and after the test was set as an amount of deposition adhering to the inside of the glass tube. A smaller deposition amount indicates that the cleanliness and stability at a high temperature are high.

The deposition amount may be 3.0 mg or less, preferably 2.5 mg or less, more preferably 2.0 mg or less, further preferably 1.5 mg or less, still further preferably 1.0 mg or less.

TABLE 4

|  |  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Lubricating oil composition | Alkenyl succinimide |  | E1 | E2 | E3 | E4 | F1 | F2 | F3 | F4 |
|  | Base number | mgKOH/g | 2.5 | 2.5 | 1.7 | 1.1 | 1.9 | 1.8 | 1.4 | 0.8 |
|  | 40° C. kinematic viscosity | mm$^2$/s | 105 | 106 | 114 | 127 | 104 | 106 | 116 | 128 |
|  | 100° C. kinematic viscosity | mm$^2$/s | 12 | 12 | 13 | 14 | 12 | 12 | 13 | 14 |
|  | Viscosity index |  | 107 | 107 | 107 | 107 | 107 | 107 | 108 | 107 |

TABLE 4-continued

|  |  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Hot tube test (230° C.) | Score | M.R. | 4 | 4 | 4 | 4 | 2 | 2 | 2 | 2 |
|  | Deposition amount | mg | 2.4 | 2.5 | 2.0 | 1.9 | 23.8 | 24.5 | 18.2 | 17.9 |

TABLE 5

|  |  |  | Example 5 | Example 6 | Example 7 | Example 8 |
|---|---|---|---|---|---|---|
| Lubricating oil composition | Alkenyl succinimide |  | E5 (boride) | E6 (boride) | E7 (acylated product) | E8 (acylated product) |
|  | Base number | mgKOH/g | 3.6 | 3.7 | 0.2 | 0.6 |
|  | 40° C. kinematic viscosity | mm$^2$/s | 124 | 119 | 97 | 97 |
|  | 100° C. kinematic viscosity | mm$^2$/s | 14 | 13 | 12 | 11 |
|  | Viscosity index |  | 106 | 107 | 108 | 106 |
| Hot tube test (250° C.) | Score | M.R. | 9 | 9 | 6 | 5 |
|  | Deposition amount | mg | 1 or less | 1 or less | 1.5 | 1.9 |

TABLE 6

|  |  |  | Example 9 | Example 10 |
|---|---|---|---|---|
| Lubricating oil composition | Alkenyl succinimide alkyl-substituted hydroxy aromatic ester |  | E5 (boride) DSDP *4 | E6 (boride) DSDP *4 |
|  | Base number | mgKOH/g | 3.6 | 3.7 |
|  | 40° C. kinematic viscosity | mm$^2$/s | 118.69 | 114.82 |
|  | 100° C. kinematic viscosity | mm$^2$/s | 13.363 | 12.961 |
|  | Viscosity index |  | 108 | 107 |
| Hot tube test (270° C.) | Score | M.R. | 10 | 10 |
|  | Deposition amount | mg | 1 or less | 1 or less |

*4: dodecylsalicylic acid dodecylphenyl ester

From Table 4 to Table 6, the followings may be found.

Although in Table 4, the amounts of alkenyl succinimides E1 to E4 and F1 to F4 contained in the lubricating oil compositions of Examples 1 to 4 and lubricating oil compositions of Comparative Examples 1 to 4 were the same, scores in the hot tube test were better, and deposition amounts were smaller in lubricating oil compositions of Examples 1 to 4.

Therefore, in consideration of the results illustrated in Table 2, the alkenyl succinimides E1 to E4 are suitable as a dispersant for a lubricating oil, which maintains or improves the high-temperature cleanliness, the base number, and the sludge dispersibility of the lubricating oil composition, and makes it possible to easily prepare the lubricating oil composition with a low viscosity.

Also, from the results illustrated in Table 5, the lubricating oil compositions of Examples 5 to 8, which each contain either one of the borides of alkenyl succinimide E5 and E6 and the acylated products of alkenyl succinimide E7 and E8, had better scores in the hot tube test at a high temperature, and smaller deposition amounts than the lubricating oil compositions of Examples 1 to 4.

Therefore, in consideration of results illustrated in Table 3, the borides of alkenyl succinimide E5 and E6, and the acylated products of alkenyl succinimide E7 and E8, are suitable as the dispersant for a lubricating oil, which maintains or improves the cleanliness, the base number, and the sludge dispersibility of the lubricating oil composition at a higher temperature, and makes it possible to easily prepare the lubricating oil composition with a low viscosity.

Also, from the results illustrated in Table 6, the lubricating oil compositions of Examples 9 and 10, in which the alkyl-substituted hydroxy aromatic ester derivative was further added in addition to the boride of alkenyl succinimide E5 or E6, had excellent scores in the hot tube test even at a higher temperature, and small deposition amounts.

Therefore, when the dispersant for a lubricating oil of the present invention is added and the alkyl-substituted hydroxy aromatic ester derivative is added to the lubricating oil composition, the cleanliness, the base number, and the sludge dispersibility of the lubricating oil composition at a higher temperature are maintained or improved, and the lubricating oil composition with a low viscosity is easily prepared.

The invention claimed is:

1. A dispersant for a lubricating oil, comprising at least one compound selected from a nitrogen-containing compound represented by any one of the following formulae (1) to (4), which is obtained by using, as raw materials, (A) at least one polyolefin selected from polybutene and polyisobutene, (B) at least one maleic acid compound selected from maleic acid and maleic anhydride, and (C) polyamine;

a boride of the nitrogen-containing compound; and an acylated product of the nitrogen-containing compound:

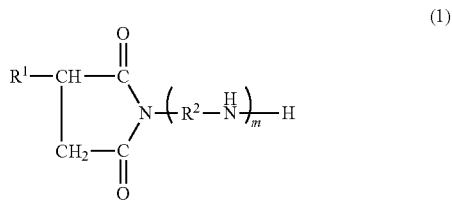

(1)

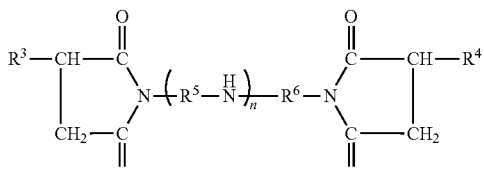

(2)

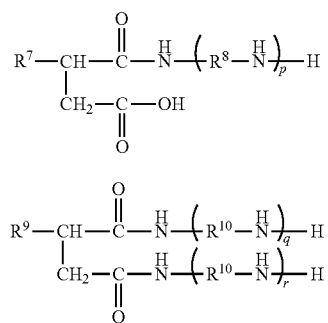

(3)

(4)

wherein each of $R^1$, $R^3$, $R^4$, $R^7$, and $R^9$ is independently an alkenyl group selected from a polybutenyl group and a polyisobutenyl group, or an alkyl group selected from a hydrogenated polybutenyl group and a hydrogenated polyisobutenyl group;

wherein a molecular weight distribution (Mw/Mn) of the alkenyl group and the alkyl group is 1.80 or less, and a mass average molecular weight (Mw) of the alkenyl group and the alkyl group is 500 to 5,000;

wherein each of $R^2$, $R^5$, $R^6$, $R^8$, $R^{10}$, and $R^{11}$ is independently an alkylene group having 2 to 5 carbon atoms;

wherein each of m, n, p, q, and r is independently an integer of 1 to 10, and wherein the at least one polyolefin (A) satisfies at least one of the following conditions (α) and (β):

(α) a ratio (Sb/Sa) of an integrated value (Sb) of a peak present at 4.40 to 5.00 ppm in a $^1$H-NMR spectrum to an integrated value (Sa) of a peak present at 5.01 to 5.60 ppm in the $^1$H-NMR spectrum is 2 or more; and (β) a ratio (Sd/Sc) of an integrated value (Sd) of a peak present at 1.76 to 2.10 ppm in the $^1$H-NMR spectrum to an integrated value (Sc) of a peak present at 1.65 to 1.75 ppm in the $^1$H-NMR spectrum is 1 or more.

2. The dispersant for a lubricating oil according to claim 1, wherein Sb/Sa is 10 or more, and Sd/Sc is 5 or more.

3. A lubricating oil composition comprising the dispersant for a lubricating oil according to claim 1 and a lubricant base oil.

4. The lubricating oil composition according to claim 3, further comprising an alkyl-substituted hydroxy aromatic ester derivative.

5. The lubricating oil composition according to claim 4, wherein the alkyl-substituted hydroxy aromatic ester derivative is a compound represented by formula (5):

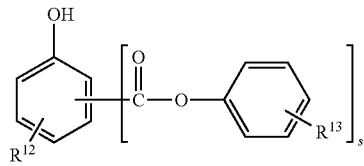

(5)

wherein each of $R^{12}$ and $R^{13}$ is independently an alkyl group or an alkenyl group having 6 to 24 carbon atoms, and wherein s is 1 or 2.

6. A method of lubricating a combustion engine, comprising: contacting a combustion engine with the lubricating oil composition of claim 4.

7. A method for producing the dispersant for a lubricating oil according to claim 1, the method comprising:

(S1) reacting the least one polyolefin (A) with the at least one maleic acid compound (B), and (S2) reacting the reaction product obtained in the (S1) with the polyamine (C) to obtain a nitrogen-containing compound.

8. The method according to claim 7, further comprising after (S1) and (S2), (S3A) reacting the nitrogen-containing compound obtained in the reaction step (S2) with a boron compound to obtain a boride of the nitrogen-containing compound.

9. The method according to claim 7, further comprising after (S1) and (S2), (S3B) reacting the nitrogen-containing compound obtained in (S2) with a carboxylic acid compound to obtain an acylated product of the nitrogen-containing compound.

* * * * *